METHOD AND APPARATUS FOR SURFACE TREATMENT OF P-N JUNCTION SEMICONDUCTORS

Filed June 15, 1959

3,041,225
Patented June 26, 1962

3,041,225

METHOD AND APPARATUS FOR SURFACE TREATMENT OF P-N JUNCTION SEMICONDUCTORS

Reimer Emeis, Ebermannstadt, Upper Franconia, Germany, assignor to Siemens-Schuckertwerke Aktiengesellschaft, Berlin, Germany, a corporation of Germany Filed June 15, 1959, Ser. No. 820,533
Claims priority, application Germany June 18, 1958
9 Claims. (Cl. 156—7)

My invention relates to a method and apparatus for the surface treatment of crystalline semiconductor bodies having at least one p-n junction and a plurality of electrodes, and more particularly to a method and apparatus of performing such treatment by means of a flowing etching agent.

The invention particularly relates to the manufacture and processing of semiconductor members for use in electric semiconductor devices such as transistors, rectifiers, or photodiodes. Such semiconductor members consist of a crystalline or monocrystalline body of germanium, silicon or an intermetallic compound of elements from the third and fifth groups of the periodic system such as indium-antimonide and indium-arsenide, or of other semiconducting compounds such as those formed by respective elements from the second and sixth groups of the periodic system such as ZnS. In a more particular aspect, my invention concerns a method and apparatus for treating the surface of such semiconductor members that are provided with a plurality of electrodes and comprise at least one p-n junction by means of a flow of etching liquid.

It is an object of my invention to augment a purifying effect of the etching liquid in a method and apparatus of the above-mentioned type and to prevent any residues of spent liquid from affecting the surface qualities of the semiconductor body.

To this end, and in accordance with a feature of my invention, I subject the flow of etching medium at its location of activity to a preferably variable extraneous force applied at the semiconductor surface in addition to a flow of etching liquid. Although the extraneous force can be applied, for example, by blowing pressure, or suction, the positive action of centrifugal force is more advantageous.

The method and apparatus are particularly applicable for the etching of semiconductor devices in which the semiconductor body proper is joined by alloyed bonds with two or more metallic electrodes, and comprises one or more p-n junctions. The method serves particularly for eliminating conducting ridges at the outer p-n boundary line at which the p-n junction area emerges at the semiconductor surface. The method is particularly advantageous for use with semiconductor members which are already attached, by welding or soldering, to a support, such as a base plate or cover plate of metal.

Figure 2:
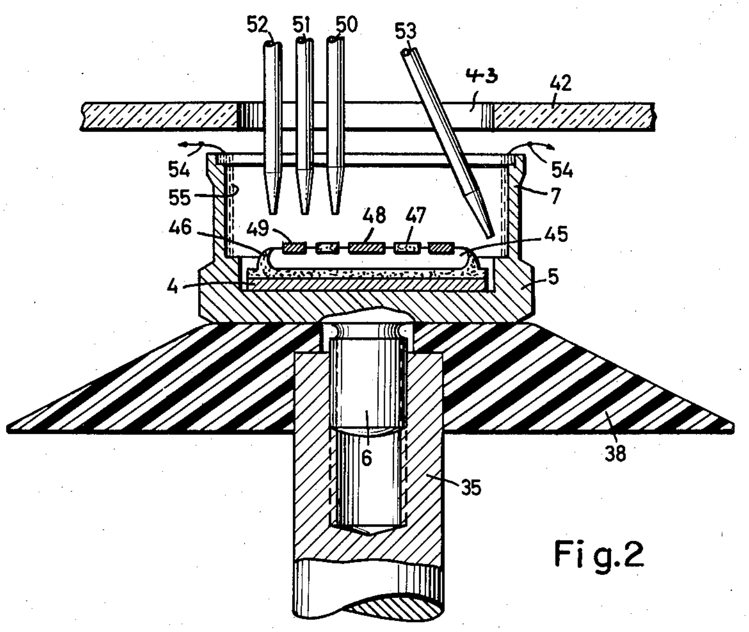
Figure 1:
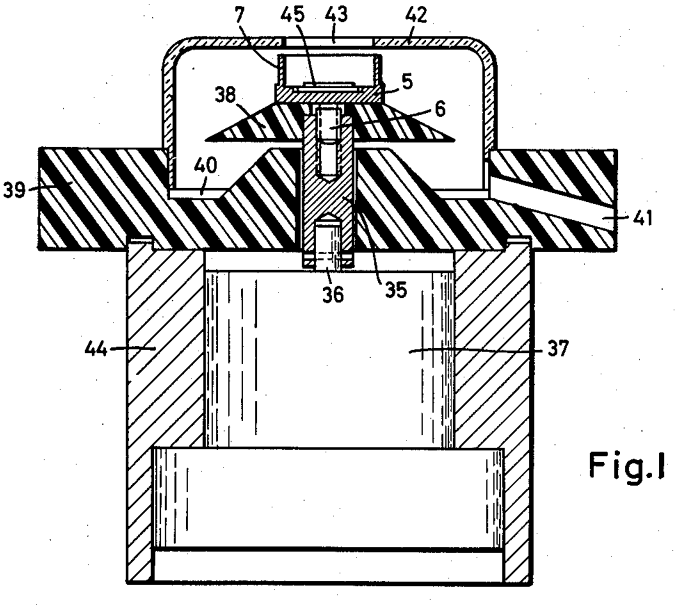

The invention will be further explained with reference to the drawings showing, by way of example, several devices for performing the method in which:

FIGS. 1 and 2 illustrate in vertical section, a processing device in which centrifugal force is imposed upon the flow of etching liquid.

The device shown in FIG. 1, part of which is shown on enlarged scale in FIG. 2, utilizes centrifugal force for increasing the flow velocity of the etching liquid by rotating the semiconductor member during processing about an axis normal to the surface being etched. During rotation, the etching liquid, supplied in form of a free jet, is flung outwardly by centrifugal force. If a radially and outwardly directed flow component is to be produced on the semiconductor surfaces being treated, then the axis of rotation must pass through the center of the semiconductor surface.

For this purpose, the semiconductor device 45 is fastened to the bottom of the housing member 5. The latter is coupled to the rapidly rotating shaft end 36 of an electric motor 37, by means of the central screw bolt 6 and an intermediate piece 35.

Preferably mounted on the intermediate coupling piece 35 is a whirling or splashing disc 38, which is made for example, of Teflon. The screwed-in housing portion 5′ firmly abuts against the upper face of the disc 38. A liquid-catching space 40 is formed in the plate 39, which may also be made of Teflon. A cap 42 is shown, made for example of polymethylmethacrylate, known under the trade name Plexiglas. The plate 39 is recessed to form the annular catching chamber or groove 40 and has a drainage bore 41. The cap 42 has a central opening 43 in its top. The plate 39 rests upon a cylindrical supporting structure 44 which also carries the motor 37.

The cap opening 43 permits the directing of a number of tubes with nozzle-shaped exit openings onto the semiconductor member 2 to be treated. By means of these nozzle tubes, denoted by numerals 50, 51, 52, 53, in FIG. 2, a flowing etching agent, preferably an etching liquid, or also a rinsing medium can be applied in form of respective pressure jets. The device facilitates not only the uniform etching of the entire semiconductor member, but also permits the limiting of the etching action to given zones by supplying the etching agent at a location eccentrically related to the axis of rotation. This will be more fully explained with reference to FIG. 2.

The semiconductor member 45 shown in FIG. 2 consists of a transistor having a semiconducting body of p-type silicon whose lower side is provided with a collector 46 by alloying an antimony-containing gold foil together with the silicon. The collector 46 extends also over the peripheral rim of the silicon disc so that the outer p-n boundary between the collector zone and the base zone of the transistor emerges at the upper side of the semiconductor member. A ring-shaped emitter 47 is produced on the top side of the silicon disc by alloying an annular antimony-containing gold foil together with the silicon. Barrier-free base contacts 48 and 49, of which the former is a full circular disc and the latter ring-shaped, are provided by alloying correspondingly shaped aluminum foils together with the silicon. The outer boundary lines of the p-n junction merges at the surface between the emitter ring 47 and the two base contacts 48 and 49 in the form of circular lines. FIG. 2 also shows, schematically, the above-mentioned nozzle tubes 50, 51, 52 and 53 for the supply of etching liquid or rinsing liquid in respectively different positions discussed presently.

When etching liquid is supplied through a nozzle tube in the position 50, the central circular area and thus the base contact 48 are not subjected to attack by the etching liquid. The etching action then extends only over an outer ring zone, commencing in the interspace between parts 47 and 48. If the base ring 49 is also to be kept away from the etching effect, distilled water is supplied through a second nozzle tube in the position 51. As a result the etching liquid supplied through tube 50, when reaching the base ring 49, is diluted to such an extent that from hereon and toward the outside no appreciable etching action takes place. After a completed etching operation, distilled water is supplied through a nozzle tube in the position 50 so that any residues of the etching liquid are rinsed away. Thereafter, the outer p-n boundary of the collector 46 can be etched with the aid of a nozzle tube in the position 52 and can thereafter be rinsed. If the housing wall 7 consists of a material that may be attacked by the etching solution, then it can be protected by supplying a rinsing agent, for example distilled water, through a nozzle tube in the position 53. Due to centrifugal force, the water forms a coherent protective layer 55 on the inner side of the housing wall 7. The supplied etching liquid and rinsing liquid flow over the upper rim of the housing wall 7 as is indicated by arrows 54 and then pass into the catch space 40 (FIG. 1) of the device.

In some cases, depending upon the design of the semiconductor members to be processed, where it is not necessary to obtain an outwardly directed flow component, centrifugal force may also be applied, for the purposes of the invention, by means of devices differing in some aspects from those so far described. For example, a number of semiconductor members can be simultaneously etched by mounting them on a disc-shaped support which is placed in rotation. The fastening can be effected by means of a suitable adhesive, for example using wax or colophony. When the current of etching agent is directed onto the rotating disc in form of a jet, the flow produced by centrifugal force is directed parallel to the semiconductor surface being processed.

Also suitable for the purposes of the invention is a drum-shaped support upon whose peripheral surface the semiconductor members are fastened. Upon rotating the drum while directing a jet of etching agent onto the surface thereof, the etching liquid is flung away radially of the drum, and hence approximately at a right angle to each semiconductor surface being treated.

These and other modifications will be obvious to those skilled in the art, upon studying this disclosure, and are intended to be within the scope of the claims annexed hereto.

I claim:

1. A process for chemical etching of a semiconductor surface of a semiconductor device having a p-n boundary zone which emerges at said surface, comprising directing a free jet of chemical etching liquid against said surface, and simultaneously rotating the surface about a vertical axis which is perpendicular to said surface, at such a speed that the liquid, after contacting the p-n junction, is removed from the said surface by centrifugal force, and applying a free jet of a liquid which dilutes and diminishes the action of said chemical etching liquid, the latter jet being applied to a region of said surface which is radially removed from the region of application of the first jet, said diluting liquid also being removed from said surface by centrifugal force.

2. A process for chemical etching of a semiconductor surface of a semiconductor device having a p-n boundary zone which emerges at said surface, comprising directing a free jet of chemical etching liquid against said surface, and simultaneously rotating the surface about a vertical axis which is perpendicular to said surface, at such a speed that the liquid, after contracting the p-n junction, is removed from the said surface by centrifugal force, the etching liquid being directed toward a location on said surface which is eccentric to the axis of rotation, so as to limit its radially most inward zone of action on said surface, and applying a free jet of a liquid which dilutes and diminishes the action of said chemical etching liquid, the latter jet being applied to a region of said surface which is radially removed from the region of application of the first jet, said diluting liquid also being removed from said surface by centrifugal force.

3. A process for chemical etching of a semiconductor surface of a semiconductor device having a p-n boundary zone which emerges at said surface, comprising directing a free jet of chemical etching liquid against said surface, and simultaneously rotating the surface about a vertical axis which is perpendicular to said surface, at such a speed that the liquid, after contacting the p-n junction, is removed from the said surface by centrifugal force, and simultaneously applying a liquid which dilutes and diminishes the action of the said chemical etching liquid, said liquid being applied to a region of said surface that is radially outward of the region of application of said free jet and outward of said p-n junction, said diluting liquid and said chemical etching liquid being centrifugally removed together.

4. A process for chemical etching of a flat semiconductor surface of a semiconductor disc transistor device having at least one p-n boundary zone which emerges at said surface, said surface having thereon a centrally located electrode, an outer ring-shaped electrode, and an intermediately located ring-shaped emitter; said process comprising rotating said surface about a vertical axis which is perpendicular to said surface, and simultaneously directing a sharply limited free jet of chemical etching liquid to a location on said surface that is radially outside said centrally located electrode, and simultaneously directing a free jet of diluting liquid to a location on said surface that is radially outside the first location and is radially inside the outer ring-shaped electrode, the diluting liquid protecting the outer electrode from the chemical etching liquid.

5. A process for chemically etching a semiconductor surface of a semiconductor device having, on said surface, a centrally located electrode and an outer, annular emergent p-n junction, comprising directing a free jet of chemical etching liquid against a region of said surface that is radially outward of said electrode, and simultaneously rotating the surface about a vertical axis which is perpendicular to said surface at such a speed that the liquid, after contacting the p-n junction, is removed from said surface by centrifugal force, and simultaneously applying a liquid which dilutes and diminishes the action of the said chemical etching liquid, said liquid being applied to a region of said surface that is radially outward of the region of application of said free jet and outward of said p-n junction, said diluting liquid and said chemical etching liquid being centrifugally removed together.

6. An apparatus for chemically etching a semiconductor surface of a semiconductor device by means of a liquid, a vessel comprising a housing means, means extending within said housing means to rotatably support said semiconductor device with said surface thereof extending upwardly and horizontally, the latter means comprising an upwardly opening cup-shaped rotatable member having a lower portion providing support for the said device and a rotatable vertical shaft for mounting the cup-shaped member, said housing means providing a lower receiving chamber for the etching liquid, and providing an outlet for the latter below the level of the support, the housing having an upper opening, nozzle means passing through said opening for directing a freely-travelling jet of chemical etching liquid toward a region of said surface being etched, means for rotating the cup-shaped member at a velocity such that the etching liquid is thrown toward the inner wall of the cup-shaped member andd flows over it and into the receiving chamber and out through the outlet, a second nozzle means for simultaneously directing diluting liquid toward a region of said semiconductor surface radially removed from the first recited region to delimit the zone of chemical action of the first recited jet.

7. An apparatus for chemically etching a semiconductor surface of a semiconductor device by means of a liquid, a vessel comprising a housing means, means extending within the housing means to rotatably support said device with said surface extending upwardly and horizontally, the latter means comprising an upwardly opening cup-shaped rotatable member having a lower portion providing support for the said device, said housing means providing a lower receiving chamber for the etching liquid and an outlet for the latter, a nozzle for directing a jet of etching liquid toward a radially inward region of said semiconductor surface, means for rotating the cup-shaped member about its axis, said axis being vertical and perpendicular to the surface of the device being etched, and said rotating being at a speed such that the etching liquid is thrown toward the inner wall of the cup-shaped member and flows over it and into the receiving chamber, a second nozzle for simultaneously directing rinsing liquid toward a radially outer region of said semiconductor surface to delimit the zone of action of the etching liquid.

8. An apparatus for chemically etching a semiconductor surface of a transistor semiconductor device, said surface having an emergent p-n junction and having a plurality of electrodes therein, the electrodes including a central electrode and an outer electrode, the apparatus comprising a vessel prroviding a housing means, means extending within the housing means to rotatably support said device so that said surface is horizontal and faces upwardly, means to direct a free jet of etching liquid towards a centrally removed portion of the surface, means to rotate the support means at a speed sufficient to fling the etching liquid outwardly along the surface being etched, and about a vertical axis that is perpendicular to the surface being etched, means to direct a diluting liquid toward a portion of the surface that is radially outward of the first portion, to delimit the portion being subjected to the etching action.

9. An apparatus for chemically etching a semiconductor surface of a semiconductor device by means of a liquid, a vessel comprising a housing means, means extending within the housing means to rotatably support said device with said surface extending upwardly and horizontally, the latter means comprising an upwardly opening rotatably mounted cup-shaped member having a lower portion providing support for the said device, said housing means providing a lower receiving chamber for the etching liquid and an outlet therefor, nozzle means for directing a freely-travelling jet of etching liquid against said semiconductor surface, means for rotating the cup-shaped member about its axis, said axis being vertical and perpendicular to the surface of the device being etched, and said rotating being at a speed such that the etching liquid is thrown toward the inner wall of the cup-shaped member and flows over it and into the receiving chamber, and means for directing rinsing liquid against the said inner wall to protect it from the action of the etching liquid.

References Cited in the file of this patent

UNITED STATES PATENTS

| | | |
|---|---|---|
| 2,124,052 | Clough | July 19, 1938 |
| 2,178,701 | Petre | Nov. 7, 1939 |
| 2,523,018 | Henderson | Sept. 19, 1950 |
| 2,577,803 | Pfann | Dec. 11, 1951 |
| 2,602,763 | Scaff et al. | July 8, 1952 |
| 2,699,793 | Buck et al. | Jan. 18, 1955 |
| 2,705,192 | Faust et al. | Mar. 29, 1955 |
| 2,746,848 | Jones | May 22, 1956 |
| 2,758,037 | Cahill | Aug. 7, 1956 |
| 2,767,137 | Evers | Oct. 16, 1956 |
| 2,797,193 | Eigler et al. | June 25, 1957 |
| 2,799,637 | Williams | July 16, 1957 |
| 2,827,723 | Clark | Mar. 25, 1958 |
| 2,869,266 | Hirdler | Jan. 20, 1959 |
| 2,908,247 | Glaze et al. | Oct. 13, 1959 |
| 2,937,124 | Vaughan | May 17, 1960 |
| 2,950,990 | Johnson | Aug. 30, 1960 |